United States Patent [19]

Hoffman et al.

[11] Patent Number: 5,266,762
[45] Date of Patent: Nov. 30, 1993

[54] METHOD AND APPARATUS FOR RADIO FREQUENCY CERAMIC SINTERING

[75] Inventors: Daniel J. Hoffman, Oak Ridge; Harold D. Kimrey, Jr., Knoxville, both of Tenn.

[73] Assignee: Martin Marietta Energy Systems, Inc., Oak Ridge, Tenn.

[21] Appl. No.: 971,204

[22] Filed: Nov. 4, 1992

[51] Int. Cl.[5] .................... H05B 6/80; H05B 6/54
[52] U.S. Cl. .................... 219/10.55 A; 219/10.55 M; 219/10.81; 264/26; 425/174.8 E
[58] Field of Search ............. 219/10.55 A, 10.55 R, 219/10.55 M, 10.81, 10.77, 10.55 F; 264/25, 26, 27; 425/174.8 R, 174.8 E

[56] References Cited

U.S. PATENT DOCUMENTS

| | | | |
|---|---|---|---|
| 2,643,434 | 6/1953 | Scharf | 264/27 |
| 2,723,334 | 11/1955 | Rambo et al. | 219/10.77 |
| 2,765,387 | 10/1956 | Wilson | 219/10.55 R |
| 2,783,344 | 2/1957 | Warren | 219/10.81 |
| 3,329,796 | 7/1967 | Manwaring | 219/10.55 R |
| 4,147,911 | 4/1979 | Nishitani . | |
| 4,163,140 | 7/1979 | Bardet . | |
| 4,339,648 | 7/1982 | Jean . | |
| 4,375,441 | 3/1983 | Adams et al. . | |
| 4,772,770 | 9/1988 | Matsui et al. . | |
| 4,880,578 | 11/1989 | Holcombe et al. . | |
| 4,963,709 | 10/1990 | Kimrey, Jr. | 219/10.55 M |
| 5,008,506 | 4/1991 | Asmussen et al. . | |
| 5,077,268 | 12/1991 | Clark et al. . | |
| 5,108,670 | 4/1992 | Holcombe et al. . | |

OTHER PUBLICATIONS

R. Jeffress, Dielectric Heating and Drying, EPRI Journal Jul./Aug. 1989.
Holcombe et al., Importance of "casketing" . . . materials, Journal of Material Science Letters 9 (1990).

Primary Examiner—Philip H. Leung
Attorney, Agent, or Firm—Edward A. Pennington; James M. Spicer; Harold W. Adams

[57] ABSTRACT

Radio frequency energy is used to sinter ceramic materials. A coaxial waveguide resonator produces a TEM mode wave which generates a high field capacitive region in which a sample of the ceramic material is located. Frequency of the power source is kept in the range of radio frequency, and preferably between 60-80 MHz. An alternative embodiment provides a tunable radio frequency circuit which includes a series input capacitor and a parallel capacitor, with the sintered ceramic connected by an inductive lead. This arrangement permits matching of impedance over a wide range of dielectric constants, ceramic volumes, and loss tangents.

18 Claims, 4 Drawing Sheets

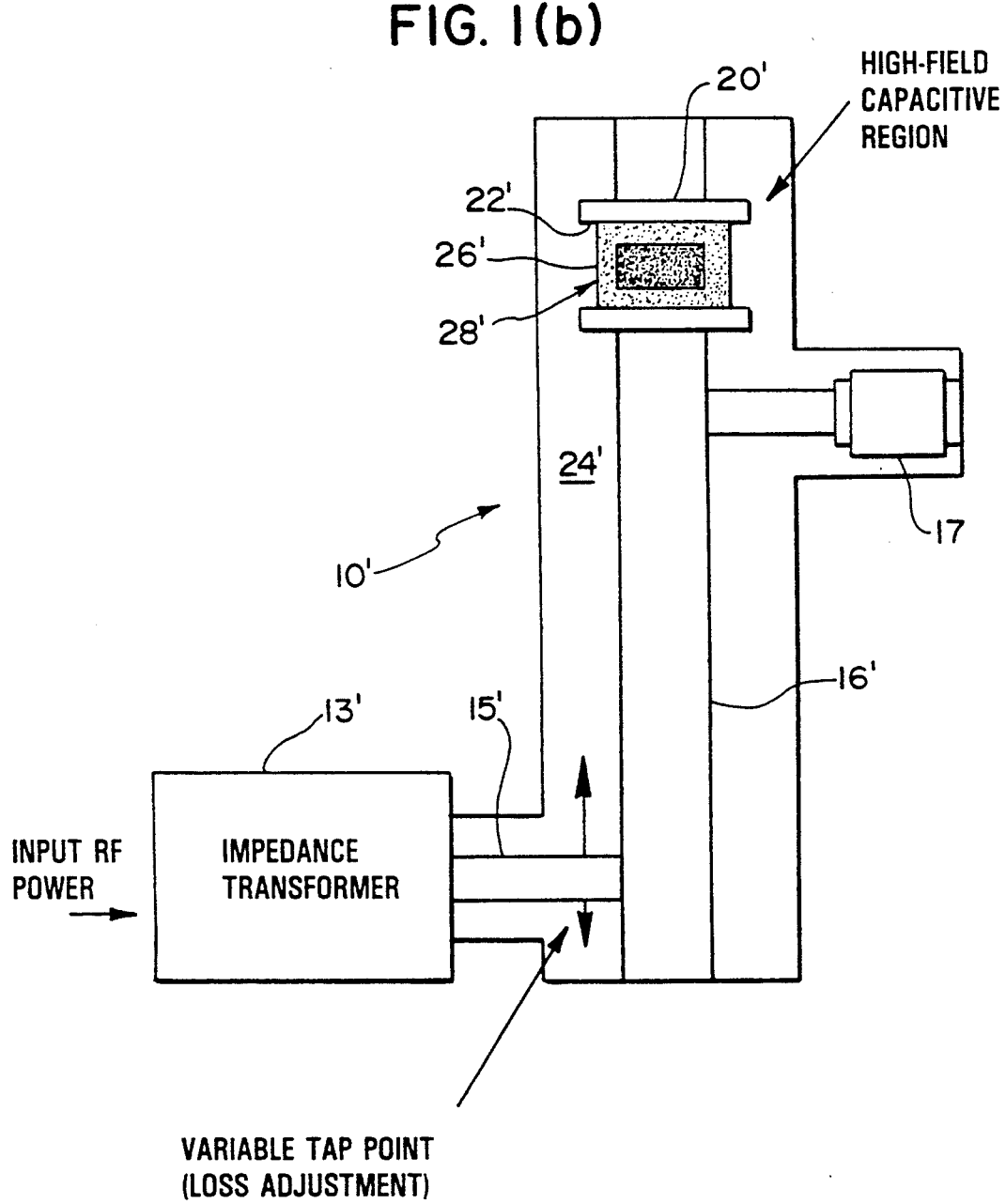

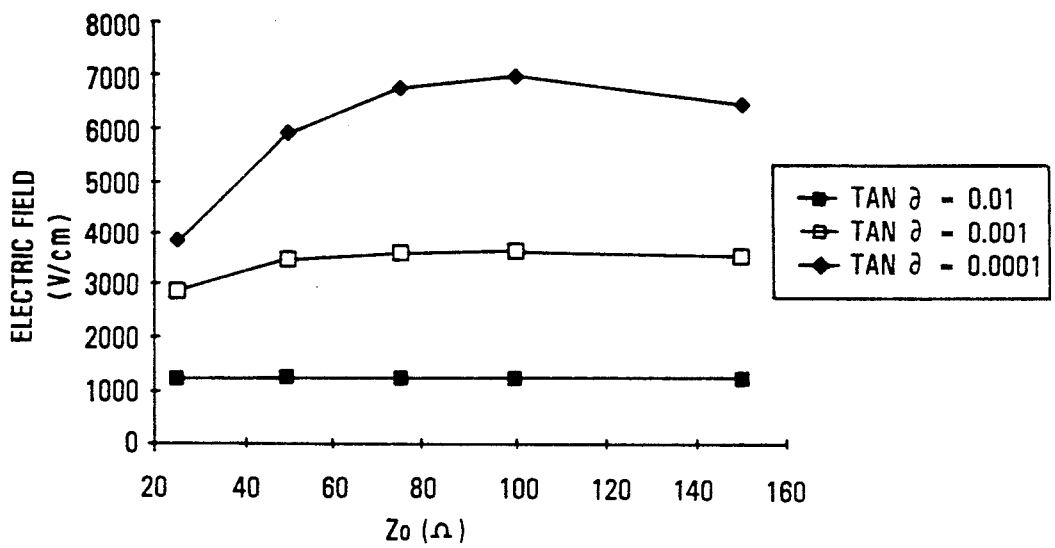
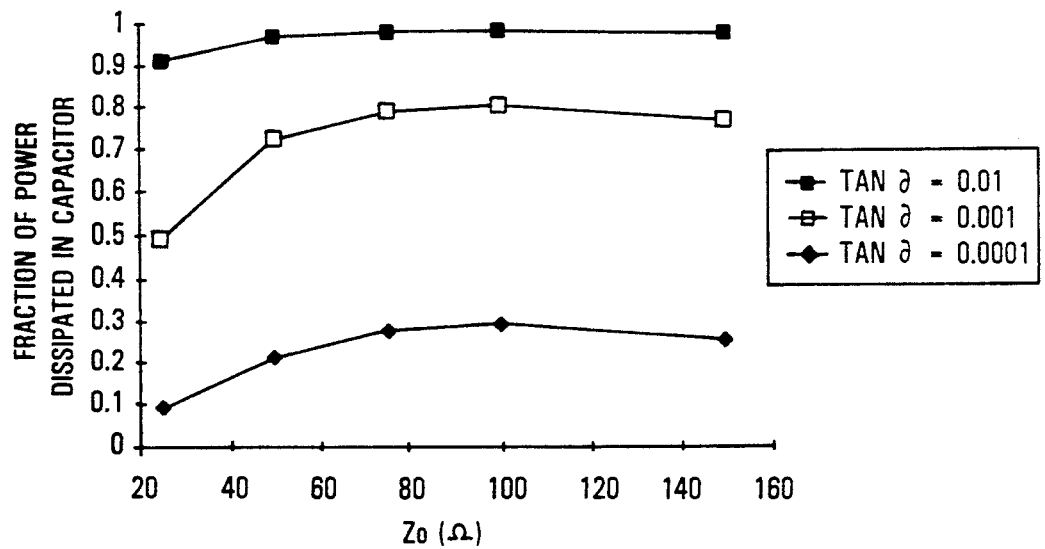

METHOD AND APPARATUS FOR RADIO FREQUENCY CERAMIC SINTERING

This invention was made with Government support under contract DE-AC05-84OR21400 awarded by the U.S. Department of Energy to Martin Marietta Energy Systems, Inc. and the Government has certain rights in this invention.

FIELD OF THE INVENTION

The present invention relates generally to ceramics and ceramics processing and, more specifically, to an apparatus and method for sintering ceramics using radio frequency energy.

BACKGROUND OF THE INVENTION

Sintering is a process necessary to the production of ceramic materials, in which microstructural changes occur in a green-formed ceramic body as a result of applied heat. As a result of sintering, densification and coarsening take place such that a reduction of material volume occurs by decreasing material porosity.

The prior art is replete with different mechanisms by which sintering is effected. These include hot pressing (the simultaneous application of pressure and heat, with heat being generated either inductively or resistively), pressureless sintering (mostly done in batch furnacing with radiant heat produced resistively), reaction sintering (where heat is generated by reaction between two constituents such as silicon and carbon), and hot isostatic pressing (known as "HIP"). One disadvantage to conventional techniques involving furnace heating to a temperature typically between 700°-1800° C. is that because the material is heated from the outside, slow heating is required to keep thermal gradients from inducing stresses in the material that can lead to cracking or breakage. Exposure to high temperatures for long periods can also cause an increase in the grain size of the ceramic, which may lead to degradation of structural properties.

Sintering with electromagnetic fields has been conducted with energy at microwave frequencies. Microwave sintering is fundamentally different from conventional sintering because heating occurs internally of the sample, as opposed to applying heat externally as in the case of a furnace. An example of an apparatus and method for sintering large ceramic articles using microwave energy can be found in U.S. Pat. No. 4,963,709 to Kimrey. As described therein, a 28 GHz, 200 kw gyrotron with variable power output is used as the microwave source. The source is connected to an untuned microwave cavity formed of an electrically conductive housing through an overmoded waveguide arrangement. The part to be sintered is placed in the cavity and supported on a removable high temperature table in a central location within the cavity.

Microwave sintering has an advantage over conventional sintering in that it can reduce both the processing temperature and the processing time for some materials. For example, recent work suggests that microwaves at 2.45 GHz and 28 GHz can cause densification to occur at a lower temperature for a given density than sintering with conventional furnaces. For sintering a zirconia-toughened alumina (ZTA) composite at a microwave frequency of 28 GHz, the ceramic reached about 97% of its theoretical density at a temperature of about 1100° C. In contrast, using a conventional furnace achieved this level with a temperature of about 1500° C. This microwave sintering process has been successfully applied to alumina, zirconia, lithium hydride, and a variety of other ceramic systems, including high-temperature superconducting materials. The reduction in processing time has reduced the grain growth of the material and the migration of impurities to grain boundaries, which could improve the mechanical properties and the reliability of the material.

Another advantage of microwave sintering over conventional sintering is related to the volumetric interaction of the electromagnetic fields with the ceramic. For low-loss materials, the microwaves more uniformly heat the ceramic volume, which means that stresses are much lower than those resulting from thermal gradients produced in the sample by conventional furnaces. This volumetric coupling to the ceramic leads to a higher heating efficiency and faster processing times than those achievable in conventional furnaces. However, because of its small penetration depth, microwave sintering is limited to material with relatively small volumes and/or low dielectric loss tangents.

SUMMARY OF THE INVENTION

An object of the present invention is to provide a method and apparatus for RF ceramic sintering high-loss, high-temperature materials.

Another object of the present invention is to provide a method and apparatus for RF ceramic sintering in which the RF wave energy couples volumetrically to lossy materials as opposed to surface heating by furnaces or somewhat shallower depths afforded by microwaves.

Another object of the present invention is to provide a method and apparatus for RF ceramic sintering capable of sintering relatively large samples, i.e., those with characteristic diameters on the order of 0.2λ (about 40 cm).

These and other objects of the invention are met by providing an apparatus for sintering a ceramic material comprising a radio frequency power supply having a frequency and impedance, waveguide means, coupled to the radio frequency power supply, for generating a high electric field capacitive region when powered by the radio frequency power supply, and means for holding a sample of the ceramic material in the high electric field capacitive region, whereby volumetric heating in the ceramic sample results when the radio frequency fields encounter the ceramic material's residual dielectric losses.

Other objects, advantages and salient features of the invention will become apparent from the following detailed description, which taken in conjunction with the annexed drawings, discloses preferred embodiments of the invention.

BRIEF DESCRIPTION OF THE DRAWINGS

FIG. 1(b) is schematic view of a second embodiment of an apparatus for radio frequency sintering ceramic materials according to the present invention;

FIG. 2 is a graph showing the maximum electric field felt on a 5 cm thick ceramic wedge as a function of loss tangent and characteristic impedance with a fixed 2 kW power level and frequency of 80 MHz;

FIG. 3 is a graph showing the fraction of power absorbed by the ceramic;

DETAILED DESCRIPTION OF THE INVENTION

Figure 1A:
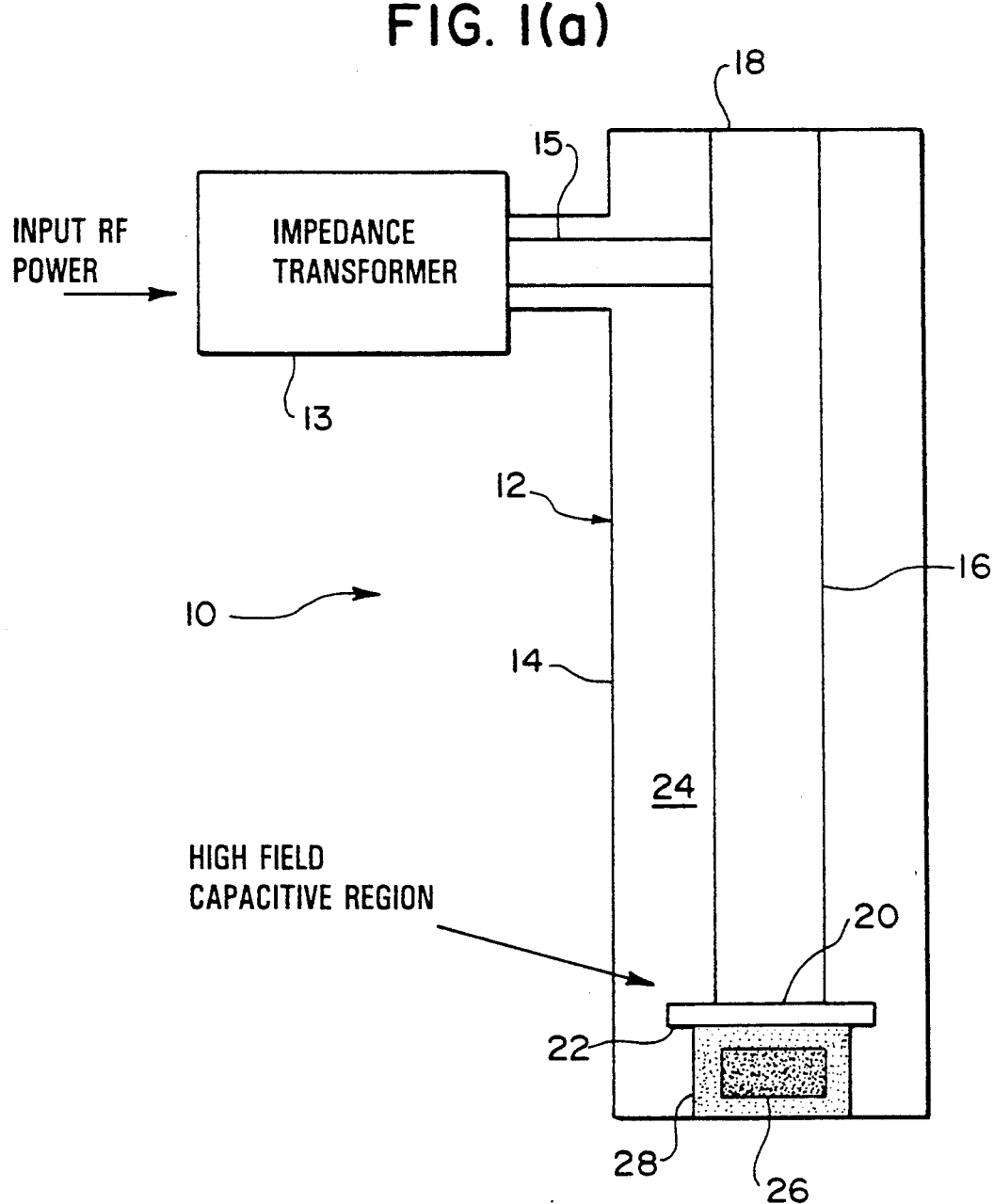
FIG. 1(a) is schematic view of a first embodiment of an apparatus for radio frequency sintering ceramic materials according to the present invention.

Referring to FIG. 1, an apparatus for radio frequency (RF) sintering ceramic materials is generally referred to by the numeral 10. A quarter-wave coaxial waveguide resonator 12 includes an outer conductor 14 and an inner conductor 16, both of which comprise hollow cylindrical tubes. One end 18 of the inner tube 16 is shorted to the outer tube 14. A plate 20, acting as an electrode, is connected to the opposite end 22 of the inner conductor 16. The annular space between the inner conductor 16 and the outer conductor 14 defines a sintering cavity 24. The inner conductor 16, in one particular embodiment, has a diameter of about 2.5 inches (63.5 mm) and the outer conductor 14 has a diameter of about 9 inches (228.6 mm). The length of the chamber corresponds to a quarter wave ($\frac{1}{4} \lambda$).

The RF power is coupled to the resonator 12 through an impedance transformer 13 near one end of the cavity 24. The RF input power can be fed with coaxial cable to the impedance transformer 13. The impedance transformer can be any matching circuit. A center conductor 15 of the coaxial cable is coupled to the inner conductor 16. Alternatively, the impedance transformer can be avoided by attaching the center conductor of the coaxial feed at variable tap point to achieve the same impedance matching effect.

Power is delivered in the range of 60 MHz, corresponding to the resonant frequency of the structure. The resonant structure is designed to produce a high electric field, or high field capacitive region, in the cavity 24 where a sample 26 of ceramic material is held. Since the cavity is coaxial, and produces a TEM mode electromagnetic wave, an equivalent circuit was analyzed by using a lossy transmission line model that included dielectric losses in the ceramic and resistive losses in the cavity. The characteristic impedance of the setup was calculated and optimized to maximize the power and electric field injected into the ceramic sample. For the calculation, the ceramic was simply modeled as a single disk with the capacitor plates touching each end. The loss tangent of the material varies through the sintering process, so three ranges were used. The maximum electric field experienced by a 5 cm thick ceramic wedge for different loss tangents is shown in FIG. 2 for a fixed 2 kW power level and frequency of 80 MHz. The Figure shows the field to be maximized approximately 75–80Ω with 7 kV/cm theoretically possible at low loss tangent. The fraction of power absorbed by the ceramic is shown in FIG. 3, and is maximized near 75Ω with about 30% absorption in the worst case (low loss tangent).

The uniformity of the electric fields in the sintering region is important because peaked electric fields can result in overheating of the specimen. An electrostatic analysis of the ceramic specimen was performed on a simple geometry where a test specimen ($\epsilon=8.9$) is surrounded by loose dielectric fiber ($\epsilon=2.3$). The loose dielectric fiber is part of a "casket" 28 of ceramic insulation which surrounds the ceramic sample, as seen in FIG. 1. The casket is described in an article entitled "Importance of 'Casketing' for Microwave Sintering of Materials", by C. E. Holcombe and N. L. Dykes in *Journal of Materials Science Letters*, 9 (1990) 425–428, which is incorporated herein by reference.

Figure 4:
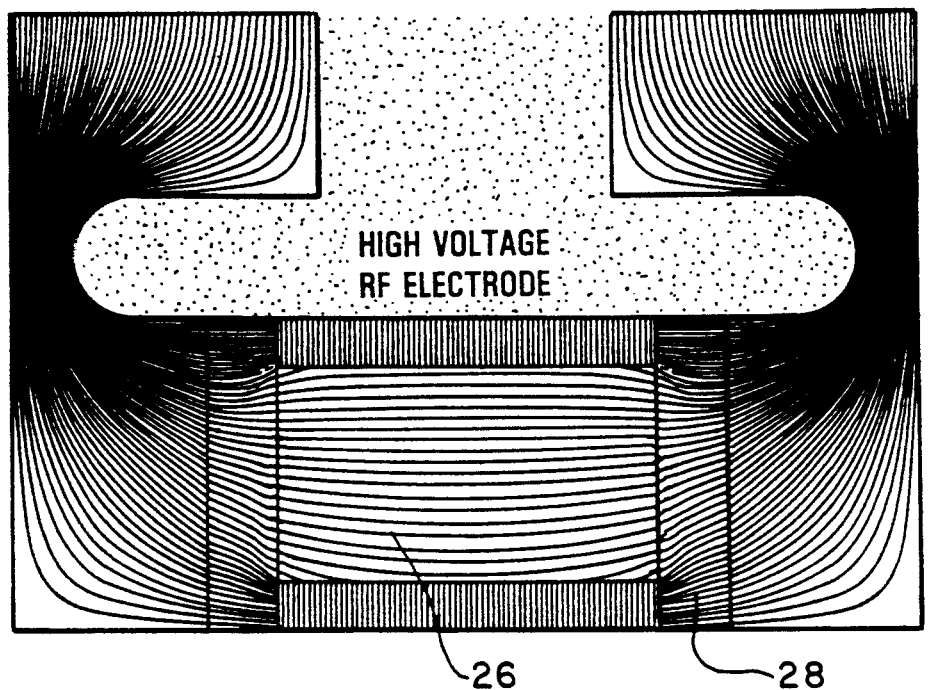
FIG. 4 is an electrostatic field pattern in the high capacitive region generated by the apparatus of FIG. 1.

FIG. 4 shows lines of constant voltage in the dielectric region. A difference between two lines is 2% of full voltage, and the gradient is the electric field. This analysis also shows that the fields in the specimen will be somewhat smaller than those implied by the circuit analysis because of the two different dielectric constants. Although the geometry was not even optimized, the field is uniform to within a few percent in the specimen and is still orders of magnitude over achievable microwave fields. Completely filling the capacitor results in uniformities within less than 0.1%. Because of the fact that the cavity is a fundamental mode, this analysis can be used to optimize the capacitor geometry for general experimentation with geometries or to optimize for a single geometry which would be mass produced.

FIG. 1(b) is a variation of the FIG. 1(a) embodiment, in which like components have the same, but primed, reference numerals. The RF power is coupled to the resonator 12' through one end of the cavity 24' with coaxial cable. A center conductor 15' of the coaxial cable is coupled to the inner conductor 16'. Instead of the impedance transformer 13', the impedance transformation can be carried out by attaching the center conductor of the coaxial feed at a variable tap point to achieve the impedance matching effect. To cope with dielectric changes in the material as it evolves in temperature, a small vacuum-variable capacitor 17 with modest external cooling is attached in parallel to the main cavity. The capacitor 17, of typically between 5–100 pF provides frequency shift adjustment while the variable tap point provides loss adjustment. With the variable tap and capacitor, the impedance transformer is not necessary.

Figure 5:
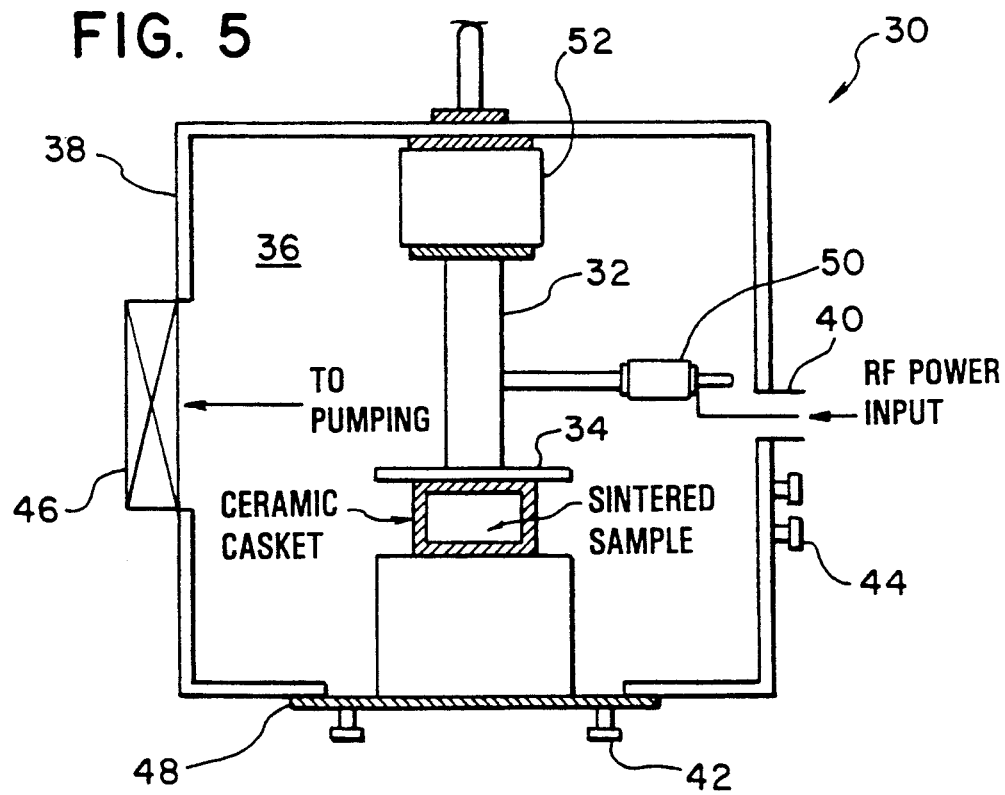
FIG. 5 is a schematic view of an apparatus for radio frequency ceramic sintering according to another embodiment of the present invention.

FIG. 5 illustrates another embodiment of an apparatus for RF ceramic sintering. The apparatus 30 is tunable and operates at 60 MHz, and includes an inner conductor 32 having a high voltage RF electrode 34 connected to one end. A vacuum chamber 36 is defined by an aluminum box 38 which measures 122 cm by 122 cm by 127 cm. Large flat flanges are located on five sides of the chamber and can be easily modified for attachment of the RF feedthrough at 40, various diagnostic ports 42, 44, a pumping port 46, and a sample handling port 48. The pumping port 46 allows the generation of a vacuum in he chamber 36, or pressure, depending on the materials being sintered. An adjacent cylindrical vacuum chamber (not shown), in fluid communication with the main chamber 36 via a large vacuum valve, can be used as part of the pumping system or sample handling system. The large inside volume of the main chamber 36 provides space for the RF hardware necessary to form the sintering volume and allows the installation of insulation and radiative reflection hardware. The apparatus 30 can thus operate in vacuum, pressure, or inert atmosphere, and can also be modified to include a microwave launcher for combined-frequency operation.

Sintering under vacuum conditions is preferred because the vacuum provides additional thermal isolation and the possibility of attaining very high electric field strengths in the material. A vacuum system with high pumping speed is required to effectively remove outgassing products that could produce undesired arc breakdown during sintering. A cryopump-based vacuum system is proposed because the outgassing products are primarily condensible at liquid nitrogen temperatures and such systems have inherently high pumping speeds. For example, the system could include two 10-inch diameter chevroned liquid nitrogen panels backed by 10-inch diffusion pumps. The effective pumping speed ranges from 4500 to 7500 L/s for a baffled 10-inch diffusion pump.

A tuning network includes a series connected tuning capacitor 50 (5-70 pF) and a parallel connected tuning capacitor 52 (15-450 pF) which is shorted. The tuned RF circuit with the series input capacitor and a parallel capacitor, with the sintered ceramic connected by an inductive lead, permits matching over a wide range of dielectric constants, ceramic volumes, and loss tangents. In all variations, the design must force the ceramic to be in the high-electric field region of the circuit (as opposed to the inductive side) so that the intense electric fields can effect direct ceramic heating. Also, the losses must be minimized in the high current regions by good conducting materials (i.e., copper, aluminum, etc.) and good connections to minimize losses and maximize efficiency.

To keep the RF power and electric field constant at the sample as the sample's dielectric losses and power absorption change, the RF tuning of the sintering cavity must be changed. This can be performed manually or automatically by a controller with a feed back loop.

The sintering enhancement seen with microwave processing may result either from the strength of the electric field interacting with the green ceramic or from the value of the sintering frequency.

The role of the electric field and the applied frequency in sintering can be seen by looking at the power deposition in a material. The amount of power per unit volume that is coupled into the ceramic by electric fields is given by the equation $$P = \tfrac{1}{2}\omega\epsilon(\tan\delta)E^2$$

where $\omega$ is the excitation frequency (in rad/s), $\epsilon$ is the permittivity of the material, $\tan\delta$ is the loss tangent of the material, and E is the electric field in the material. This equation shows that the losses are proportional to the frequency, the loss tangent, and the square of the electric field. In the typical microwave range, the frequency is high ($10^{10}$ Hz), the electric field is low (<100 V/cm), and the loss tangent is generally high ($10^{-2}$).

The present invention entails the use of radio frequency (RF) energy for sintering ceramics. The advantage of RF sintering over microwave sintering is related to the higher electric fields and greater sample penetration depth obtained with RF sintering. For RF sintering the frequency is lower ($10^8$ Hz), the loss tangent is generally lower ($10^{-3}$), and the electric field is higher (1000 V/cm). Thus, compared to most microwave techniques, RF absorption is reduced by three to four orders of magnitude in the product of frequency and loss tangent, but electric field effects are up to four orders of magnitude higher because the field is 10 to 100 times greater. Therefore, RF sintering has roughly the same total power deposition as microwave sintering but has a much higher electric field and can be used to determine whether the critical component of electromagnetic energy sintering is the strength of the electric field or the value of the excitation frequency.

Like microwave sintering, RF sintering is accomplished by direct interaction of the electric fields with a dielectric. However, the lower frequencies should allow better penetration of the fields for high-loss materials. Sintering with both microwaves and RF energy is accomplished by volumetric coupling to lossy materials, as opposed to surface heating by conventional furnaces, but the RF energy will penetrate to much greater depths than those attained with microwaves.

In contrast to microwave sintering, the wavelengths of the RF waves are considerably greater than the dimensions of the cavity. This generally results in a single permissible mode of operation, requiring tuning and impedance matching circuitry not found in microwave furnaces. It is therefore possible to determine the changes in permittivity of the ceramic as a function of temperature during the course of the sintering run.

While the present invention is particularly well suited for heat treating high-loss materials, it may also be applied to low-loss ceramic materials, such as, but not limited to, alumina. Preferably, the ceramic material is selected from the group consisting of alumina, zirconia, tungsten carbide, aluminum nitride, ZTA, boron carbide, titanium carbide, and (Ba, Sr) TiO3.

While advantageous embodiments have been chosen to illustrate the invention, it will be understood by those skilled in the art that various changes and modifications can be made therein without departing from the scope of the invention as defined in the appended claims.

What is claimed is:

1. An apparatus for sintering a ceramic material comprising:
   a radio frequency power supply having a frequency and impedance;
   waveguide means, coupled to the radio frequency power supply, for generating a high electric field capacitive region when powered by the radio frequency power supply; and
   means for forming a uniform electric field comprising loose dielectric material cooperating with said electric field generating means to provide a uniform, electric field capacitive region;
   means for holding a sample of the ceramic material in the high electric field capacitive region, whereby volumetric heating in the ceramic sample results when the radio frequency fields encounter the ceramic material's residual dielectric losses.

2. An apparatus according to claim 1, further comprising means for matching the impedance of the radio frequency power supply to an impedance of the waveguide means.

3. An apparatus according to claim 1, wherein the waveguide means comprises a coaxial waveguide resonator having an outer conductor and an inner conductor, one end of the inner tube being shorted, and a plate, functioning as an electrode, being connected to the opposite end of the inner conductor.

4. An apparatus according to claim 1, wherein the frequency of the power supply is between 40-100 MHz.

5. An apparatus according to claim 1, wherein the waveguide means comprises an inner conductor and an outer conductor, a cavity being defined between the inner and outer conductors, and means for creating a vacuum in the cavity.

6. An apparatus according to claim 1, wherein the waveguide means comprises a quarter wave coaxial waveguide resonator producing a TEM mode wave.

7. An apparatus according to claim 1, wherein the waveguide resonator includes an inner conductor shorted at one end and having an electrode at the opposite end, and an outer conductor.

8. An apparatus according to claim 7, further comprising tuning means for forming a tuned radio frequency circuit with the sample of ceramic material.

9. An apparatus according to claim 1, wherein the tuning means comprises a first capacitor connected in series between the inner conductor and the power supply and a second capacitor connected in parallel to the inner conductor, the second capacitor being shorted.

10. An apparatus according to claim 1, wherein the loose dielectric material is a ceramic casket encasing the sample of ceramic material to be sintered and the holding means includes means for supporting the casket and ceramic material to be sintered.

11. In combination, a system for sintering a ceramic material and a ceramic material to be sintered comprising:
a high-loss, high-temperature ceramic material;
a radio frequency power supply for volumetric heating of ceramic materials having a frequency impedance;
waveguide means, coupled to the radio frequency power supply, for generating a high electric field capacitive region when powered by the radio frequency power supply;
means for forming a uniform electric field comprising loose dielectric material cooperating with said electric field generating means to provide a uniform, electric field capacitive region; and
means for holding said ceramic material in high electric field capacitive region, whereby volumetric heating in the ceramic sample results when the radio frequency field encounters the ceramic materials residual dielectric losses.

12. A method for sintering a ceramic material comprising:
providing a radio frequency power supply having a frequency and impedance;
generating a high electric field capacitive region when powered by the radio frequency power supply with waveguide means coupled to the radio frequency power supply;
forming a uniform electric field by encasing the ceramic material in a loose dielectric material; and
holding a sample of the ceramic material in the uniform high electric field capacitive region, whereby volumetric heating in the ceramic sample results when the radio frequency field encounter the ceramic material's residual dielectric losses.

13. A method according to claim 12, further comprising matching the impedance of the radio frequency power supply to an impedance of the waveguide means.

14. A method according to claim 12, wherein the waveguide means comprises a coaxial waveguide resonator having an outer conductor and an inner conductor, one end of the inner tube being shorted, and a plate, functioning as an electrode, being connected to the opposite end of the inner conductor.

15. A method according to claim 12, further comprising enveloping the sample of ceramic material in a ceramic casket.

16. A method according to claim 12, wherein the waveguide means comprises an inner conductor and an outer conductor, a cavity being defined between the inner and outer conductors, and the method further comprises creating a vacuum in the cavity.

17. A method according to claim 12, wherein the ceramic material is selected from the group consisting of alumina, zirconia, tungsten carbide, aluminum nitride, ZTA, boron carbide, titanium carbide, and (Ba, Sr) $TiO_3$.

18. A uniformly sintered ceramic material prepared by, providing a ceramic material to be sintered in a loose dielectric casket prepared by:
providing a radio frequency power supply having a frequency and impedance;
generating a uniform high electric field capacitive region by using the radio frequency power supply and waveguide coupled thereto in combination with the loose dielectric casket surrounding the ceramic material to be sintered; and
holding a sample of the ceramic material to sintered in the uniform high electric field capacitive region, whereby volumetric heating in the ceramic sample results when the radio frequency field encounters the ceramic material residual dielectric losses.

* * * * *